United States Patent [19]

Barber

[11] Patent Number: 4,560,019

[45] Date of Patent: Dec. 24, 1985

[54] ALL-TERRAIN VEHICLE WITH TRACTIVE ROLLER ASSEMBLY

[76] Inventor: William F. Barber, R.R. No. 4, Olney, Ill. 62450

[21] Appl. No.: 616,980

[22] Filed: Jun. 4, 1984

[51] Int. Cl.[4] .............................................. B62D 55/00
[52] U.S. Cl. .................................... 180/9.32; 180/9.28
[58] Field of Search ...................... 180/9.1, 9.32, 9.28, 180/9.30

[56] References Cited

U.S. PATENT DOCUMENTS

| | | | |
|---|---|---|---|
| 1,358,575 | 11/1920 | Rimailho | 180/9.32 |
| 1,592,654 | 7/1926 | Bremer | 180/9.32 |
| 2,012,090 | 8/1935 | Straussler | 280/150 |
| 2,019,482 | 11/1935 | Barnes | 180/9.1 |
| 2,489,349 | 11/1949 | White | 55/6 |
| 2,959,201 | 11/1960 | LeTourneau | 144/34 |
| 3,054,467 | 9/1962 | Seiler | 180/20 |
| 3,057,319 | 10/1962 | Wagner | 115/1 |
| 3,254,738 | 6/1966 | Larsen | 180/9.1 |
| 3,306,250 | 2/1967 | Pitchford | 180/9.32 |
| 3,346,062 | 10/1967 | Richison et al. | 180/9.3 |
| 3,417,832 | 12/1968 | Ziccardi | 180/9.3 |
| 3,477,535 | 11/1969 | Wyatt | 180/20 |
| 3,570,604 | 3/1971 | Allard | 172/22 |
| 3,698,499 | 10/1972 | Albertson | 180/6.2 |
| 3,794,121 | 2/1974 | Drozak | 172/21 |
| 3,820,497 | 6/1974 | Konijn | 115/1 R |
| 4,157,877 | 6/1979 | Lee | 404/128 |

Primary Examiner—Ira S. Lazarus
Attorney, Agent, or Firm—John E. Reilly

[57] ABSTRACT

An all-terrain vehicle includes a vehicle body with ground-engaging tracks and boom members pivotally mounted at each end of the vehicle which support generally cylindrical, cleated roller assemblies, the roller assemblies being characterized by having a plurality of fingers eccentrically mounted for extension and retraction with respect to the housing as the housing is rotated. Either roller assembly can be independently operated to perform digging and clearing operations as well as to permit lifting or lowering of the vehicle and at the same time cooperate in advancing the vehicle over uneven or hilly terrain.

21 Claims, 9 Drawing Figures

FIG. 7

ALL-TERRAIN VEHICLE WITH TRACTIVE ROLLER ASSEMBLY

This invention generally relates to an all-terrain vehicle; and more particularly relates to a novel and improved vehicle having a tractive roller assembly to increase the mobility, traction and versatility of the vehicle.

BACKGROUND AND FIELD OF THE INVENTION

A number of approaches have been taken in the construction and design of all-terrain vehicles for military, commercial or recreational use. Typically, however, these vehicles utilize the basic construction of a military tank in which tracks located on either side of the vehicle body can be driven in unison or separately controlled in speed to effect steering of the vehicle both in a forward and reverse direction. In the past, the track-type vehicles have suffered definite limitations insofar as their use over rough terrain is concerned, since they tend to lose traction in passing over ditches, craters, ridges and other obstacles. Moreover, the unbalancing effect in passing over sharp ridges or other obstacles is such as to cause loss of control and possible damage to the vehicle or injury to the operator. Similarly, these vehicles have difficulty in negotiating soft or muddy terrain.

In the past, it has been proposed to equip vehicles of the type described with roller assemblies or auxiliary propulsion elements at opposite ends. For example, U.S. Pat. No. 3,477,535 to H. M. Wyatt discloses a vehicle having front and rear roller assemblies which can be lowered to raise the vehicle off the ground but has limited traction or propulsion capabilities insofar as being able to advance the vehicle over rough terrain is concerned. U.S. Pat. No. 2,489,349 to C. C. White is directed to a track-type vehicle equipped with disks mounted on articulated frames at opposite ends of the vehicle. The vehicle can be propelled only by the disk assemblies; however, owing to the construction of the disks, their utilization as a means of propulsion is largely limited to hard, smooth ground and not to rough or soggy terrain. U.S. Pat. No. 3,570,604 to P. L. Allard similarly is directed to a vehicle provided with spiked wheels journaled on hingedly mounted frames at the front and rear ends of the vehicle. The frames can be lowered until the wheels engage the ground and the vehicle body is elevated whereupon an independent hydraulic motor must be activated to rotate the wheels and advance the vehicle, its principal intended use being as a lawn conditioning element. Other representative approaches and designs relating to articulated roller assemblies mounted at opposite ends of a vehicle are disclosed in U.S. Pat. Nos. 1,358,575 to E. Rimailho; 2,012,090 to N. Straussler; 2,959,201 to R. G. Le Tourneau; 3,054,467 to E. W. Seiler; 3,057,319 to E. A. Wagner; 3,417,832 to J. J. Ziccardi; 3,698,499 to R. V. Albertson; 3,794,121 to D. A. Drozak; 3,820,497 to N. G. Konijn; and 4,157,877 to B. R. Lee.

Thus to my knowledge no one has devised an all-terrain vehicle provided with articulated tractive roller assemblies mounted at opposite ends of the vehicle which is capable of negotiating rough or muddy terrain while possessing both digging and ground clearing capabilities.

SUMMARY OF THE INVENTION

It is therefore an object of the present invention to provide for a novel and improved all-terrain vehicle which is characterized by its stability and traction in negotiating rough or uneven terrain.

Another object of the present invention is to provide in a track-type vehicle for novel and improved tractive roller assemblies at opposite ends of the vehicle which can be operated in unison with or independently of the main propulsion system of the vehicle.

It is a further object of the present invention to provide for novel and improved tractive roller assemblies adaptable for use with track-type vehicles which are capable of serving both as a means of added propulsion while at the same time being capable of being operated independently as digging and ground clearing implements as well as to permit lifting or lowering of the vehicle.

It is an additional object of the present invention to provide in an all-terrain vehicle for novel and improved tractive roller assemblies at opposite ends of the vehicle which will cooperate in advancing the vehicle over rough or soft terrain, can be used independently as the main ground-engaging drive of a vehicle in grading, digging and filling and further to provide a means of leveling the vehicle in traversing steep grades.

In accordance with the present invention, a track-type vehicle comprises a vehicle body with ground-engaging tracks mounted on the vehicle body for advancing the vehicle, front and rear arm members pivotally mounted for swinging movement through a vertical plane relative to the front and rear ends of the vehicle body, each set of arms carrying generally cylindrical, cleated roller assemblies, each said roller assembly having a generally cylindrical housing and a plurality of fingers eccentrically mounted within the housing for extension and retraction with respect to the housing as the housing is rotated. Means are drivingly connected to the housing for rotating the housing, and pivot control means are drivingly connected to each of the sets of arms at opposite ends of the vehicle to control pivotal movement of the arms and attached cylindrical cleated members. Preferably, each cylindrical cleated member is provided with conical end sections including eccentrically mounted fingers which will undergo extension and retraction through said conical end sections in response to rotation of the cylindrical cleated member. Moreover, each arm is preferably defined by a crank pivotally connected to a support housing, the pivotal movement of each being independently controlled by hydraulic cylinders so as to achieve maximum mechanical advantage and precise control over the movement of the cleated cylindrical members.

In the preferred form of the present invention, the tractive roller assemblies are employed in combination with a track-type vehicle in which a common hydraulic control circuit is capable of rotating the track members as well as independently controlling the pivotal movement and rotation of the tractive roller assemblies. In this way, propulsion of the vehicle in a forward or reverse direction is accomplished by the combination of the tracks and tractive roller assemblies, the degree of pressure exerted by the tractive roller assemblies against the ground being controlled by the hydraulic cylinders attached to the arm members for the tractive roller assemblies and which pressure can be independently controlled by the operator as well as being automatically controlled in response to sensing the angle of the vehicle in traversing steep grades. Accordingly, greater force can be imparted to the trailing roller assembly than to the leading roller assembly in ascending a steep grade while imparting a greater pressure on the leading roller than on the trailing roller in descending a grade. In a stationary or rest position, increased pressure can be applied in rotating the roller assemblies, for example, to carry out digging, grading or fill operations. The retractable arrangement of the fingers enables them to be self-cleaning, for example, in advancing through heavy underbrush or when being used as a tool.

Other objects, advantages and features of the present invention will become more readily appreciated and understood when taken together with the following detailed description in conjunction with the accompanying drawings, in which:

DETAILED DESCRIPTION OF THE PREFERRED EMBODIMENT

Figure 1:
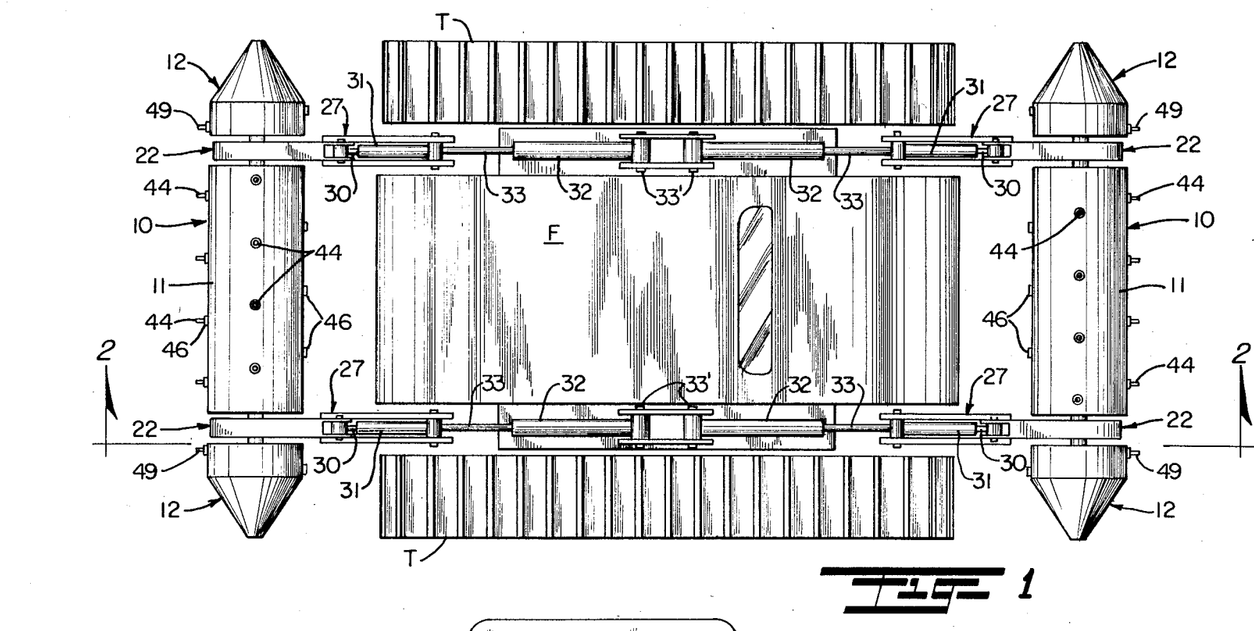
FIG. 1 is a top plan view of a preferred form of all-terrain vehicle in accordance with the present invention.
Figure 2:
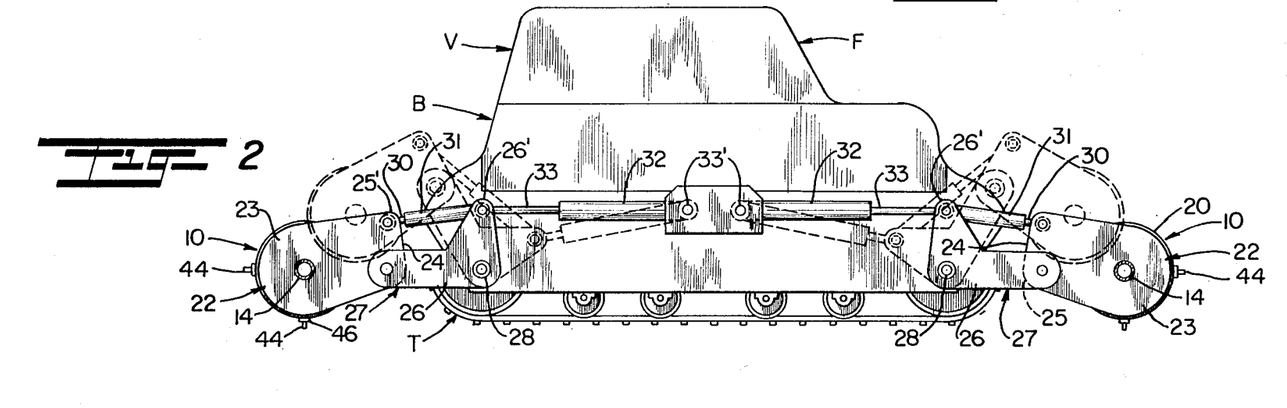
FIG. 2 is a side elevational view of the vehicle illustrated in FIG. 1 and further illustrating pivotal movement of the tractive roller assemblies with respect to the vehicle.

Referring in detail to the drawings, there is illustrated in FIGS. 1 and 2, a tractive roller assembly 10 mounted at the front and rear ends of a conventional track-type vehicle generally designated at V. Conventionally, the vehicle includes an operator section F mounted on a conventional body designated at B and driven by tracks T on opposite sides of the body of the vehicle.

Figure 3:
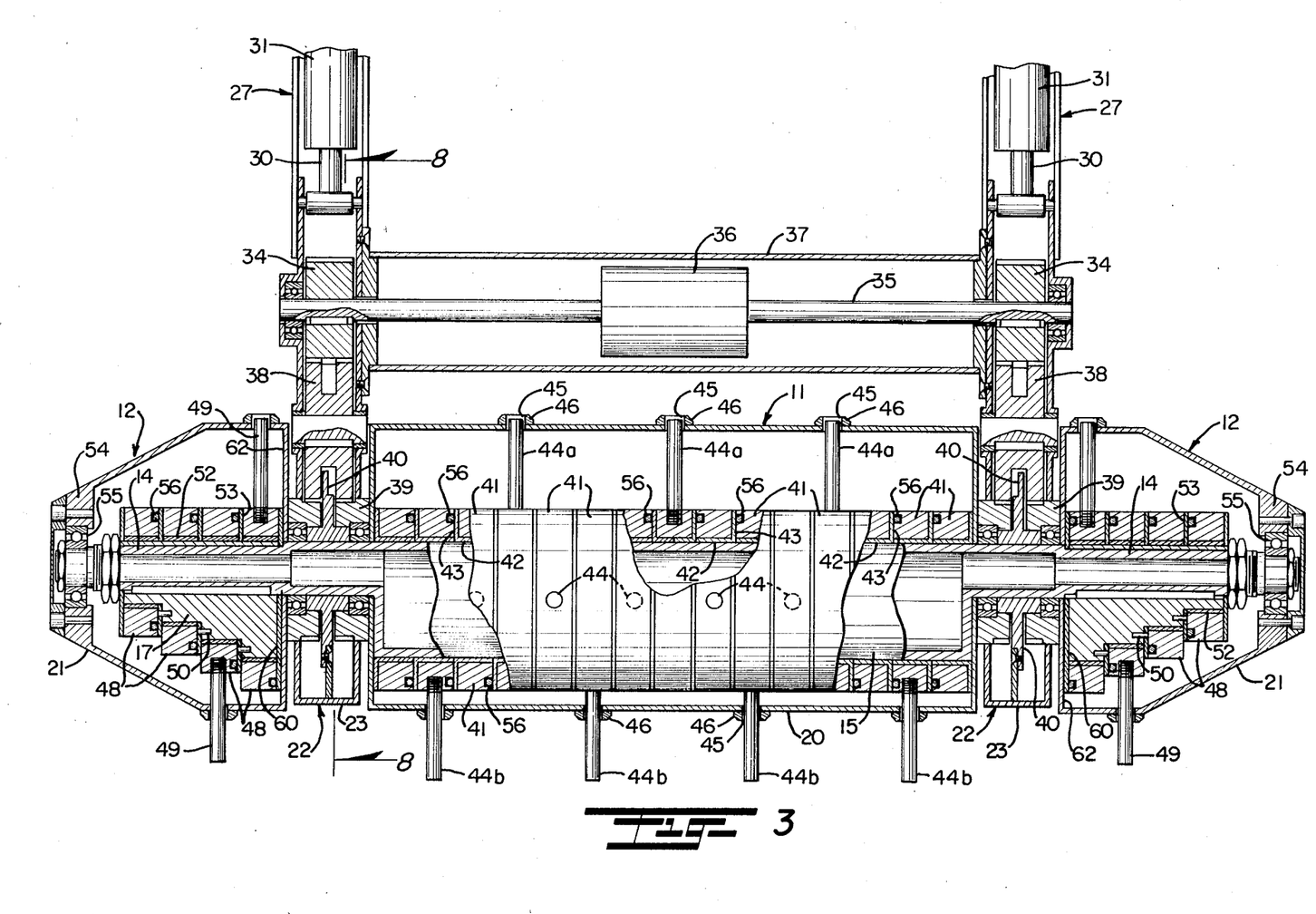
FIG. 3 is an enlarged view, partially in section and in more detail of one of the tractive roller assemblies.

In the preferred form, each roller assembly is comprised of a central, generally cylindrical section 11 and opposed generally conical end sections 12. As shown in FIG. 3, the center and end sections 11 and 12 are assembled together on a common dead axle 14 traversing the length of the sections 11 and 12. In the center section, the dead axle 14 has a hollow, elongated eccentric portion 15, and stepped-down eccentric portions 17 are affixed to opposite ends of the dead axle 14 within each of the conical sections 12.

As shown in FIGS. 1 to 3, a center housing 20 is separated from end housings 21 by pivotal gear housings 22, each gear housing having a semi-circular end 23 and an opposite, generally rectangular end 24. At the rectangular end 24, one corner 25 is pivotally connected to the lower link arm 26 of a pair of closely-spaced, parallel bell cranks 27 which are pivotal in unison about a hub 28 at one end of the vehicle V. Another corner 25' is connected to the piston rod or plunger 30 at the end of hydraulic cylinder 31 which is secured to the other link arm 26' of the spaced parallel bell cranks 27. A longer cylinder 32 has its piston end 33 attached to the vertical arm 26' of bell cranks 27, the cylinder 32 being mounted for rotational movement about a fixed pivotal axis 33 on the vehicle V.

Referring specifically to FIG. 3, there is associated with each gear housing 22 a drive gear 34 at opposite ends of drive shaft 35, the drive shaft 35 extending from a common motor 36 in housing 37. Housing 37 is joined at opposite ends to the bell cranks 27, and opposite ends of the drive shaft 35 are supported in bearings in one of the bell cranks 27 at each end of the housing 37. Each drive gear 34 intermeshingly engages an idler gear 38 which drives a double or split gear 39 supported on bearings on either side of a fixed web or plate 40. The plate 40 is keyed to the dead axle 14 while the split gears 39 are journaled on the dead axle and are drivingly connected into the center and end housings 20, 21 of the tractive roller assembly 10 so as to synchronously rotate the center and end housings.

Figures 4, 5:
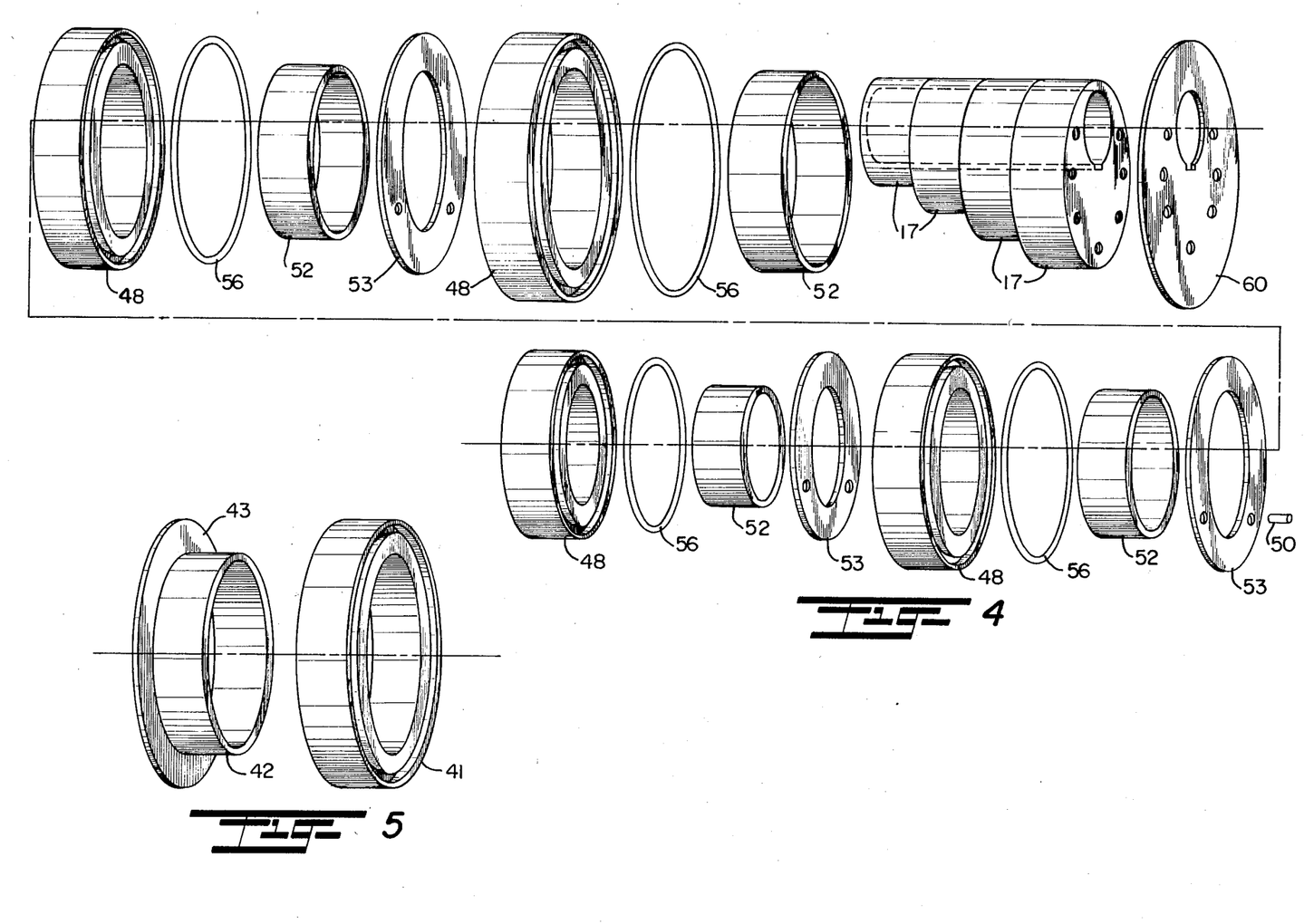
FIG. 4 is an exploded view of a cylindrical pleated member for one of the tractive roller assemblies.
FIG. 5 is another exploded view in more detail illustrating the eccentric mounting elements of one of the cylindrical cleated members.
Figure 6:
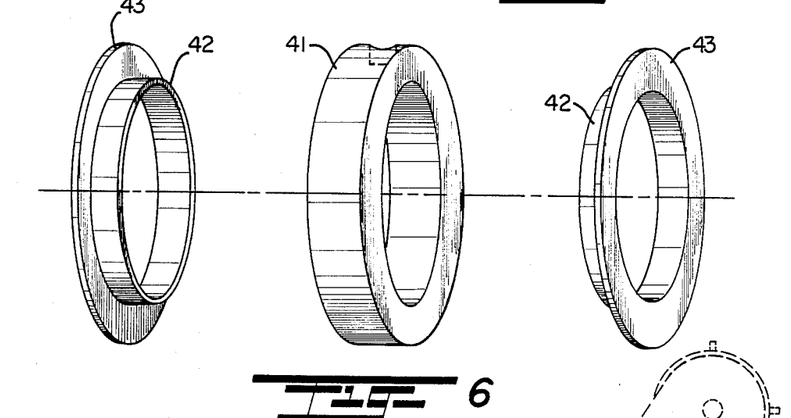
FIG. 6 is another exploded view illustrating one of the eccentric mounting elements for the fingers in a conical end section of a cylindrical cleated member.

In the center housing 20, each of a series of doughnut-shaped or annular support rings 41 is mounted on an inner cylindrical bushing 42 and a radially outwardly extending thrust plate 43 on one side of the ring 41, as shown in FIG. 5. The opposite side of each ring 41 has a circular bearing member 56 partially inserted in an annular groove on the side of the ring so as to bear against the next adjacent thrust plate 43. As noted, the support rings 41 and intervening thrust plates 43 are disposed in juxtaposed relation across the length of the support housing 20 and are journaled on the eccentric support section 15, the center ring 41 being interposed between a pair of rings 43 as shown in FIG. 6. Each support ring 41 has a radially directed finger 44 mounted thereon for outward radial projection through an aligned opening 45 in the outer housing, each opening having a surrounding bushing element 46 through which the finger extends. Each finger is preferably in the form of an elongated solid or rigid rod or spike. As the outer housing 20 is rotated, it will cause the fingers to follow rotation of the housing 20 as the annular support rings 41 are rotated around the eccentric portion 15. This will cause the fingers to progressively advance from a retracted position as shown, for example, at 44a to a projected position as shown in at 44b through the outer housing wall through each one-half revolution, then through the remainder of its revolution will return to a retracted position. The fingers are staggered with respect to one another preferably by spacing them 90° with respect to adjacent fingers so that the fingers will alternately and progressively advance into the projected position as they are rotated around the eccentric member.

The conical end sections 12 are correspondingly provided with annular support rings 48 upon which are mounted fingers 49, each support ring 48 mounted on an eccentric surface of progressively reduced diameter, as defined by the stepped-down portions 17, which proceed outwardly from the gear housing 22 to the extreme end of each conical section 12. Specifically, each support ring 48 is supported on an eccentric surface by an inner circumferential bushing plate 52 and a side thrust plate 53, each thrust plate 53 and attached bushing 52 being affixed by means of suitable fasteners 50 into the side of a stepped surface. In this way, the support rings are journaled by the bushings 52 on the stepped portions and are free to slide with respect to the thrust plate of the next larger stepped portion as well as with respect to the wall of the housing so as to reduce friction therebetween.

The reduced end extremity of each conical end section 12 has a thickened end portion 54 which rides on the outer race of a bearing 55, the inner race of the bearing 55 being affixed to the end of the dead axle 14. The enlarged end of the eccentric portion 17 is connected to an end plate 60 which bears against the end wall 62 of the housing 21. In the same manner as described with respect to the center section, the fingers 49 are staggered with respect to one another with an approximate spacing of 90° therebetween so that they can alternately and progressively advance into projected or extended positions as they are rotated about the eccentric portion 17.

Figure 7:
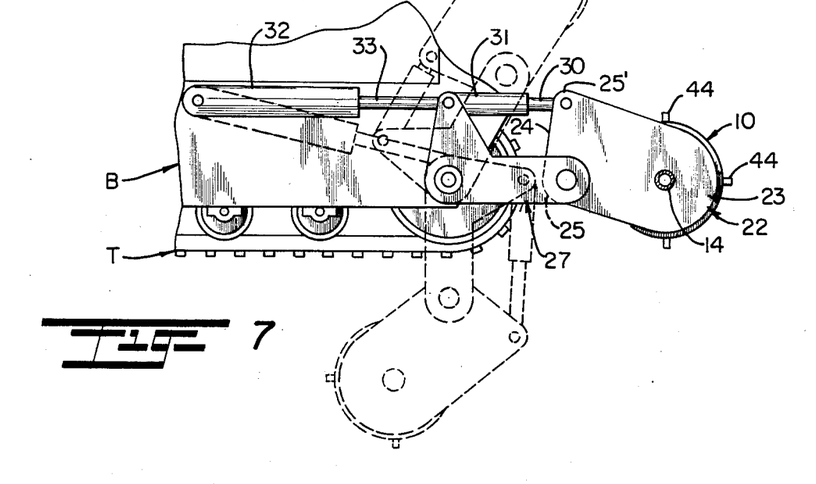
FIG. 7 is a side view in more detail illustrating the range of pivotal movement of one of the tractive roller assemblies with respect to the vehicle.
Figure 8:
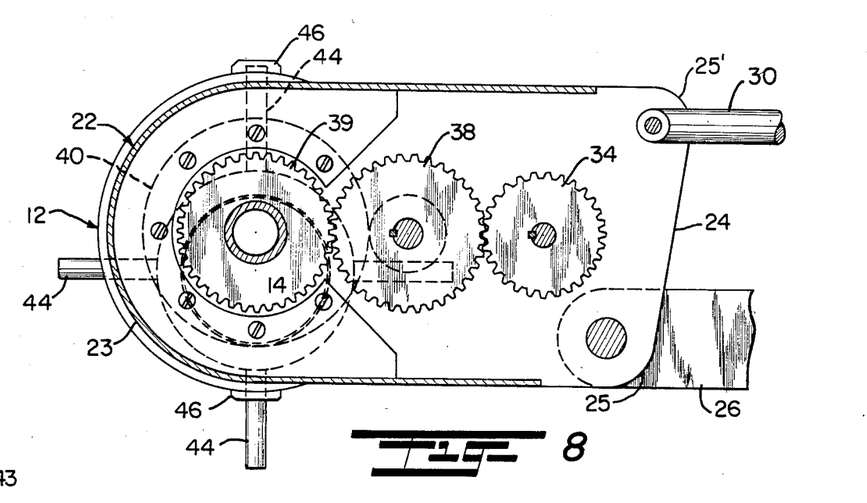
FIG. 8 is a sectional view of one of the pivotal mounting booms and gear drives for a tractive roller assembly.

From FIGS. 1 and 2, it will be noted that a pair of cylinders 31 and 32 are mounted on opposite sides of the body of the vehicle both at the front and rear ends to regulate the vertical movement of the tractive roller assemblies between a raised position, as shown in dotted form in FIG. 2, to an angle which, although not shown, will project the assemblies 10 downwardly beneath the tracks T and in this way be capable of effectively lifting the vehicle off of the tracks T in the manner illustrated in more detail in FIG. 7.

Figure 9:
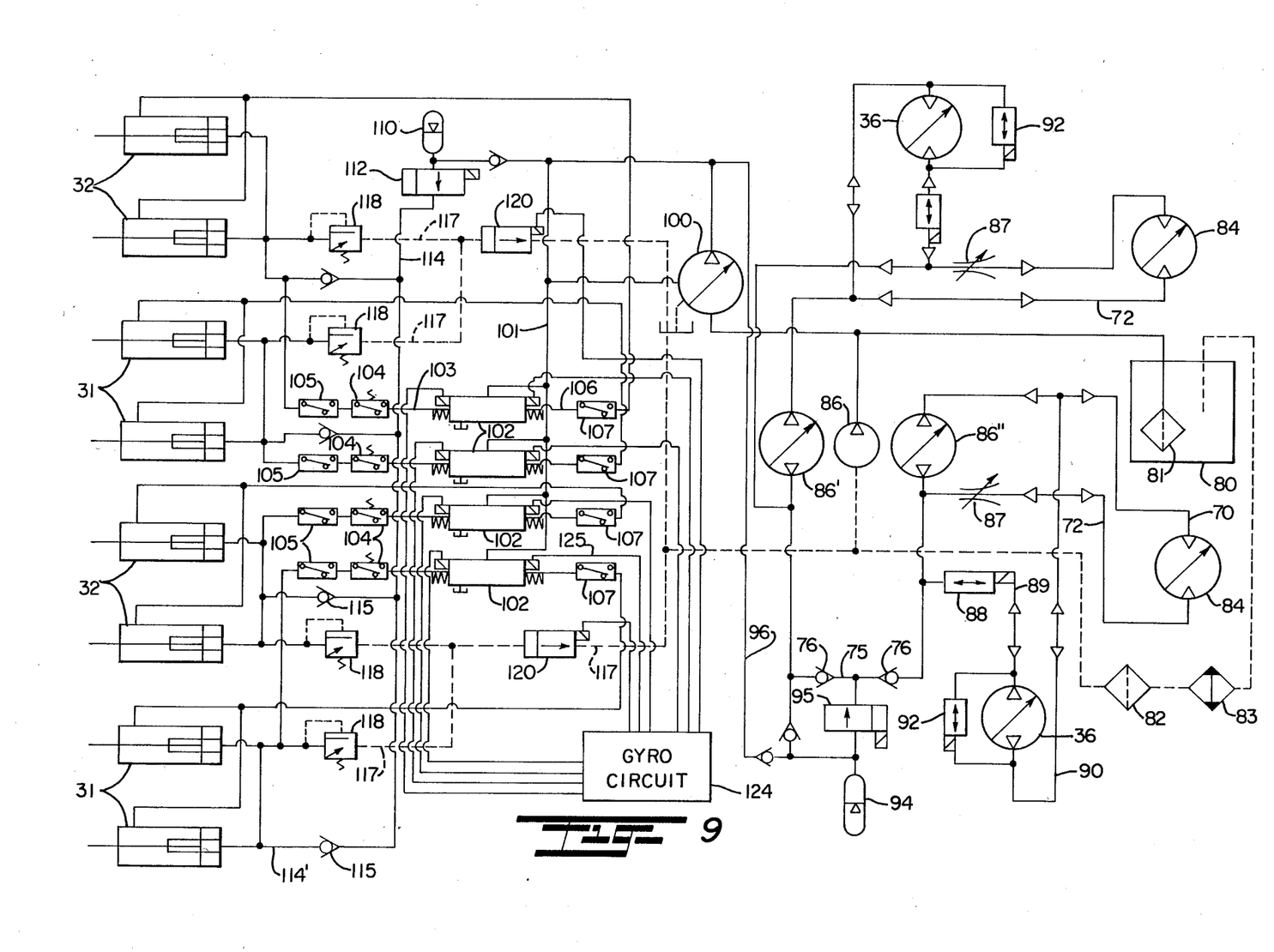
FIG. 9 is a flow diagram of a preferred form of hydraulic control circuit for the vehicle of the present invention.

A preferred form of hydraulic control circuit is illustrated in FIG. 9 wherein a reservoir 80 includes a conventional strainer 81, filter 82 and cooler 83 in the return line, shown in dotted form, to the reservoir. A variable displacement motor 84 is provided for each track of the vehicle V, and each tractive roller assembly at the front and rear has its own variable displacement motor 36. Under normal driving conditions, the variable displacement double pumps 86' and 86" are associated with auxiliary charging vane pump 86, a Model TA1919V20, manufactured and sold by Sperry Vickers of Troy, Mich. which supplies fluid under pressure to the track drive motors 84 via forward and reverse lines 70 and 72. Thus, each pump 86' and 86" has a swash plate control and will operate to deliver fluid under pressure through control valves 87 to drive the motor 84 in one direction; or can be reversed to direct fluid under pressure through the motor 84 in the opposite direction. The priority flow valves 87 are connected into one side of each motor 45 so as to give prioritize flow to the motors 36 when more pressure is needed for the cylinders 31 and 32, such as, for use of the tractive roller assemblies in digging operations.

Each pump 86' and 86" delivers fluid under pressure to the roller drive motors 36, this fluid being directed through control valve 88 and pressure line 89 in a forward direction and through pressure line 90 in the reverse direction. A second control valve 92 is shunted across or bridges the intake and discharge sides of the motor 36 to place the motor in the free-wheeling position.

Additional energy is stored in the accumulator 94 for each forward and reverse drive circuit and, upon demand for acceleration or increased velocity, will automatically deliver additional fluid under pressure through dump valve 95 and via branch lines 75, each containing a check valve 76, and through each of the pumps 86' and 86" to each of the track drive motors 84. Fluid returns to the accumulator 94 via line 96 in order to charge it up rapidly when there is no demand on pump 100 and there is excess pressure in the system.

The pump 100 is a pressure compensated fixed displacement pump which is operative to supply fluid under pressure directly from the reservoir 80 via line 101 into control valves 102. Each control valve 102 is a closed center, four-way valve connected to each pair of cylinders 31 and 32 on opposite sides of the front and rear tractive roller assemblies 10. A pressure line 103 extends from each control valve 102 and is provided with adjustable pressure-sensitive valves 104 and 105 with a line extending into the cylinder ends of the longer cylinders 32. The pressure switch or valve 104 senses the drop in pressure in the pressure line 103 to activate control valve 102 and, for example, will maintain the valve 102 in an open position until its associated cylinders 32 are extended and the pressure is increased in the pressure lines. For example, this would occur when the cylinders are extended to force the tractive roller assemblies into engagement with the ground and when the pressure increases beyond the pressure setting of the switches 104 to cause the switches to open and return the valves 102 to a closed position whereby to hold pressure in the line. Each valve 105 operates more in the manner of a shut-off valve, independently of the valve or switch 104, to sense an abnormally high pressure condition and return the valve 102 to a closed position. In this relation, it will be noted that the pressure line 101 extends or is connected to the center of each valve 102, and the end of the valve 102 opposite to pressure line 103 also has a pressure line 106 with a relief valve 107 which extends to the leading end of each double-acting cylinder. In addition, a hand or foot control, not shown, associated with each control valve controls the application of fluid under pressure to each pair of cylinders in traversing uneven or difficult terrain. Normally, in traversing flat or smooth terrain, the tractive roller assemblies 10 can be raised to the position as shown in dotted lines in FIGS. 1 and 7 so that fluid pressure is applied only to the track drive motors 84.

Again, each pressure sensitive valve 104 is preset to a predetermined pressure level so as to automatically compensate for variations in pressure. If the pressure should increase beyond a preset limit, for example, in driving the tractive roller assemblies 10 downwardly against the ground surface, pressure is relieved by an adjustable relief valve 118. The same is true if pressure is applied from the opposite side of the control valve to the leading end of the cylinders in which event pressure is relieved by the relief valves 118 independently of the pressure valves 104 or 105.

In certain situations, when it is desired to raise or lift the machine, the vehicle is suspended from the tractive roller assemblies by advancing the assemblies 10 to the lower dotted line position illustrated in FIG. 7. This can be accomplished by activating an accumulator 110 which receives excess fluid pressure from the pressure line 96 leading from pump 100 and dumps its stored fluid under pressure through a dump valve 112 and via pressure line 114 which communicates with branch lines 114' having check valves 115 therein in order to simultaneously advance each of the cylinders to their suspended positions while bypassing the pressure lines 103. Return lines 117 extend from the piston end of the cylinders, each provided with a relief valve 118 and direct the fluid back through normally open dump valves 120 of the throttling type into the reservoir 80. It should be noted that the dump valves 95 and 112 are normally closed but will open when called for to deliver the higher pressure fluid from the accumulators 94 and 110.

In operation, a hydraulic control circuit as described is manually controllable from the operator section to perform various functions. For example, in accord with the conventional practice, the track drive motors 84 can be independently operable through foot control panels in the operator section to control steering and rate of speed of the vehicle. In other words, turning in either direction can be controlled by regulating the relative speed of each track drive motor. In over-the-road use, normally the roller assemblies 10 are advanced to a raised position, such as, the uppermost position illustrated in dotted form in FIG. 2, by retracting the inboard cylinders 32 and extending the outboard cylinders 31. Conversely, the tractive roller assemblies can be pivoted to a position as illustrated in full both in FIGS. 2 and 7 in which the cylindrical beater elements will cooperate with the tracks in propelling the vehicle in either desired direction by extending the inboard cylinders 32 and retracting the outboard cylinders 31. Continued extension both of the inboard and outboard cylinders is effective to advance the cylindrical beater elements in a downward direction either to increase the pressure with the ground or if desired to raised the main body of the vehicle above the ground. As previously described, the pressure switches 104 will regulate the amount of pressure applied to the cylinders 31 and 32 within a predetermined setting or limit. However, when the vehicle is at rest this pressure may be increased by activating the accumulator 110 via dump valve 112 to bypass the pressure sensing valves 104 and 105 and deliver fluid directly to the cylinders via the branch lines 114'.

As further represented in FIG. 9, a gyro control circuit 124 is electrically connected via the solenoid control 125 for the valves 102 in order to automatically control the pivotal movement of the front and rear tractive roller assemblies depending upon the attitude of the vehicle in climbing or descending steep grades or hills. For instance, the gyro circuit 124 may be a Model No. VG24-08254 manufactured and sold by Humphrey, Inc. of San Diego, Calif. In traveling up a steep incline, the gyro will automatically respond to the inclination of the vehicle to regulate the relative amounts of pressure applied to each of the front and rear tractive roller assemblies. Thus generally as the vehicle is traveling uphill the gyro circuit will respond to increase the pressure at the rear tractive roller assembly while maintaining the pressure at the front tractive roller assembly. Conversely, as the vehicle starts downhill, the front tractive roller assembly is pivoted downwardly to increase the pressure with the ground surface while maintaining the pressure at the rear tractive roller assembly. This can be most efficiently done by permitting the gyro to operate either the back or front assembly depending upon whether the vehicle is traveling uphill or downhill. If traveling uphill, the gyro will operate the rear assembly and the pressure compensating switches will regulate the pressure of the front roller with respect to the ground surface; and the reverse is true in traveling downhill. Most desirably, the manual control will override the gyro circuit so that the operator may at any time assume control of the tractive roller assemblies whether or not the gyro circuit has been activated.

If it is desired to employ either the front or rear tractive roller assembly in digging or clearing operations, the vehicle is advanced into position and either of the drive motors 36 is operated to rotate the beater elements, for example, in clearing brush, digging or grading. As the gear housing is rotated, the fingers are progressively extended as they move into a ground-engaging position, then retracted through the housing so as to remove any debris or dirt from the fingers as they move away from the ground-engaging position. Most desirably, the fingers are displaced from one another as shown so that they will successively advance into engagement with the ground. The conical end sections further cooperate in digging or clearing operations but more importantly lend increased stability to the vehicle, for example, in traversing side hill inclines.

It will be appreciated that in certain applications it may be necessary only to employ a tractive roller assembly at one end of the vehicle, particularly if the roller assembly is to be utilized only in clearing or grading operations and not to aid in propulsion of the vehicle over uneven terrain. Moreover, the tractive roller assemblies as described can be efficiently utilized in combination with vehicles other than track-type vehicles, although for the reasons described can be most efficiently operated with a common hydraulic control circuit which is employed to operate the tracks of the vehicle. In addition, it will be evident that various angle or tilt sensing units can be employed in place of the gyro circuit, in which event the attitude of each roller assembly can be manually controlled to adjust the angle of each roller assembly in response to changes in slope or angle being traversed.

Accordingly, it is to be understood that the above and other modifications, changes and alterations may be made in the construction and arrangement of the preferred embodiment of the present invention without departing from the spirit and scope thereof as defined by the appended claims.

I claim:

1. In a track-type vehicle having a vehicle body with ground-engaging tracks mounted on said vehicle body for advancing said vehicle along a ground surface, a boom member pivotally mounted for swinging movement through a vertical plane relative to one of the front and rear ends of said vehicle body, said boom member supporting a generally cylindrical, cleated roller assembly thereon, the combination therewith comprising:

said generally cylindrical cleated roller assembly having a generally cylindrical housing, a plurality of fingers eccentrically mounted within said housing for extension and retraction with respect to said housing as said housing is rotated;

means drivingly connected to said housing for rotating said housing; and pivot control means drivingly connected to each of said boom members at one end of said vehicle body to control pivotal movement of said boom and attached cylindrical cleated roller assembly.

2. In a track-type vehicle according to claim 1, said cleated cylindrical roller assembly provided with conical end sections having eccentrically mounted fingers, said fingers undergoing extension and retraction through each of said conical end sections in response to rotation of said cylindrical cleated roller assembly.

3. In a track-type vehicle according to claim 1, said boom having a pair of crank members pivotally connected to opposite sides of said vehicle, and pivot control means for controlling the movement of said crank members.

4. In a track-type vehicle according to claim 1, including an elongated eccentric member mounted in said housing, support rings journaled on said eccentric member, and said fingers carried by said support rings for extension through openings in said outer housing.

5. In a track-type vehicle according to claim 4, said fingers being mounted in staggered relation to one another along the length of said housing to progressively advance between a retracted position substantially within said housing and an extended position beyond said housing under rotation of said outer housing.

6. In a track-type vehicle according to claim 2, each said conical end section provided with stepped eccentric portions, annular support rings journaled on said eccentric portions and a plurality of said fingers mounted on each of said annular support rings for outward radial extension through openings in said conical end section housings.

7. In a track-type vehicle according to claim 1, said means for rotating said housing for said roller assembly including a hydraulically operated control circuit, said control circuit including pressure-sensing means operative to independently sense the pressure exerted by each of said roller assemblies against the ground surface.

8. In an all-terrain vehicle having a vehicle body with ground-engaging tracks mounted on said vehicle body for advancing said vehicle, front and rear arm members pivotally mounted at the front and rear ends of said vehicle body, for swinging movement through vertical planes, each of said arm members carrying generally cylindrical, cleated roller assemblies thereon, the combination therewith comprising:

said generally cylindrical cleated roller assemblies each having a generally cylindrical housing, a plurality of fingers eccentrically mounted within said housing for extension and retraction through openings in said housing as said housing is rotated;

means drivingly connected to said housing for rotating said housing; and pivot means drivingly connected to each of arm members at opposite ends of said vehicle and hydraulically operated pivot control means to control pivotal movement of each of said arms and attached cylindrical cleated roller assemblies independently of one another.

9. In an all-terrain vehicle according to claim 8, each of said cleated cylindrical roller assemblies provided with conical end sections having eccentrically mounted fingers, said fingers undergoing extension and retraction through said conical end sections in response to rotation of said cylindrical cleated roller assemblies.

10. In an all-terrain vehicle according to claim 8, each said arm defined by a crank pivotally connected to a support housing, and said pivot control means controlling the pivotal movement of each crank.

11. In an all-terrain vehicle according to claim 8, including an elongated concentric member mounted in said housing of each roller assembly, support rings journaled on said eccentric member, and fingers carried by said support ring for extension through openings in said outer housing, said fingers mounted in staggered relation to one another along the length of each said housing to progressively advance between a retracted and extended position beyond said housing under rotation of said outer housing.

12. In an all-terrain vehicle according to claim 9, each said conical end section provided with stepped eccentric portions, annular support rings journaled on said eccentric portions and a plurality of fingers mounted on each of said annular support rings for outward radial extension through openings in said conical end section housings.

13. In an all-terrain vehicle according to claim 8, said means for rotating said housing for each of said roller assemblies including a hydraulically operated control circuit, said control circuit including pressure-sensing means operative to independently sense the pressure exerted by each of said roller assemblies against the ground surface.

14. An all-terrain vehicle adapted for traversing uneven or hilly terrain and for performing digging, grading or fill operations comprising in combination:

a vehicle body having ground-engaging tracks mounted thereon;

front and rear arm members pivotally mounted at the front and rear ends of said vehicle body, a generally cylindrical, cleated roller assembly mounted at free distal ends of each of said arm members, each said roller assembly having a generally cylindrical housing, a plurality of fingers eccentrically mounted within said housing for extension and retraction with respect to said housing as said housing is rotated; and hydraulically operated control circuit means including means drivingly connected to each said housing for rotating same, pivot control means drivingly connected to each of said arm members at opposite ends of said vehicle to control the pivotal movement of said arm for raising and lowering said roller assembly, and pressure sensing means associated with said pivot control means to independently sense the pressure exerted by each of said roller assemblies against the terrain.

15. In a vehicle according to claim 14, said pressure sensing means responsive to a predetermined pressure level applied to said pivot control means by one of said cleated roller assemblies to prevent the delivery of additional hydraulic fluid under pressure to its associated pivot control means.

16. In a vehicle according to claim 14, said hydraulically operated control circuit means including accumulator means bypassing said pressure sensing means to increase the fluid pressure applied to said pivot control means.

17. In a vehicle according to claim 14, each of said front and rear arm members defined by a bell crank member pivotally connected to opposite sides of said vehicle at each of said front and rear ends thereof, said pivot control means including a first hydraulic cylinder pivotally interconnecting one free end of said bell crank to said vehicle body and a second hydraulic cylinder interconnecting said one free end of said bell crank to one end of said roller assembly.

18. In a vehicle according to claim 17, a second free end of said bell crank being pivotally interconnected to said roller assembly in vertically spaced relation beneath the pivotal interconnection of said second hydraulic cylinder to said roller assembly.

19. In a vehicle according to claim 14, opposite ends of each said roller assembly including a generally rectangular gear housing, a gear drive enclosed within said housing, and said hydraulically operated control circuit means including hydraulic motor drive means drivingly connected to said gear drive for rotation of each of said roller assemblies.

20. In a vehicle according to claim 19, each of said front and rear arm members defined by bell cranks pivotally connected to opposite sides of said vehicle body, each bell crank including a forward extension pivotally connected to one of said gear housings, said hydraulically operated control circuit means including a first hydraulic cylinder pivotally interconnecting an upward extension of said bell crank to one side of said vehicle body and a second hydraulic cylinder pivotally connecting said upward extension of said bell crank to said gear housing.

21. In a vehicle according to claim 20, said first and second hydraulic cylinders being independently operable by said control circuit means to control lifting and lowering of said roller assembly between an upwardly inclined position above the terrain and a downwardly inclined position beneath said ground-engaging tracks whereby to support said vehicle body solely by means of said roller assemblies.

* * * * *